United States Patent [19]
Mara et al.

[11] 3,780,256
[45] Dec. 18, 1973

[54] METHOD FOR PRODUCING SPIKE-FREE ELECTRON BEAM PARTIAL PENETRATION WELDS

[75] Inventors: Glenn L. Mara, Cupertino, Calif.; Robert C. McMaster, Delaware, Ohio

[73] Assignee: The United States of America as represented by the United States Atomic Energy Commission, Washington, D.C.

[22] Filed: Aug. 8, 1972

[21] Appl. No.: 278,858

[52] U.S. Cl. ............................... 219/121 EM
[51] Int. Cl. ............................... B23k 15/00
[58] Field of Search ............ 219/121 EB, 121 EM; 250/49.5 R, 49.5 TE

[56] References Cited
UNITED STATES PATENTS

| | | |
|---|---|---|
| 3,033,974 | 5/1962 | Schleich et al. ............... 219/121 EM |
| 3,196,246 | 7/1965 | El-Kareh .................. 219/121 EM X |
| 3,308,263 | 3/1967 | Schleich ..................... 219/121 EB |
| 3,585,385 | 6/1971 | Daigne et al. ............. 219/121 EM X |
| 3,347,701 | 10/1967 | Yamagishi et al. ....... 219/121 EM X |
| 3,476,906 | 11/1969 | Rovan ......................... 219/121 EB |
| 3,294,951 | 12/1966 | Olson ..................... 219/121 EM X |
| 3,259,730 | 7/1966 | Wehde et al. ............. 219/121 EM X |
| 3,413,517 | 11/1968 | Barber et al. ............. 219/121 EB X |
| 3,364,087 | 1/1968 | Solomon et al. ............. 219/121 EM |

*Primary Examiner*—Thomas J. Kozma
*Assistant Examiner*—Gale R. Peterson
*Attorney*—John A. Horan

[57] ABSTRACT

A technique is provided for prevention of "spiking" in electron beam partial penetration welds which involves pulsing the electron beam so as to prevent achievement of steady state conditions which cause such spiking. The rate of pulsing required is determined by the electron beam oscillation frequency which is a function of total beam power, beam power density, welding speed, and the properties of the particular material being welded.

4 Claims, 3 Drawing Figures

METHOD FOR PRODUCING SPIKE-FREE ELECTRON BEAM PARTIAL PENETRATION WELDS

BACKGROUND OF THE INVENTION

This invention was made in the course of, or under, a contract with the United States Atomic Energy Commission.

In the operation of partial penetration electron beam welding devices, a phenomenon termed "spiking" is encountered. These "spikes" are fused areas which extend beyond the normal welding depth, some to the extent of complete penetration. This is an undesirable occurrence and considerable study has gone into the search for a solution. Attempts have been made to monitor the beam for irregularities which would give some clue as to the cause of spiking and also in an effort to find some characteristic which could be modified or controlled to eliminate this problem.

Some prior work in this area has met with limited success. For example, defocusing of the electron beam was found to reduce the severity of spikes but at the sacrifice of penetration. Another approach deflected the beam periodically to reduce the effects of spiking. None of these approaches have solved the problem of spiking, however.

Experimental work has been carried out at the Ohio State University Research Foundation, under a subcontract of the abovementioned contract, in an attempt to solve this spiking problem. Through the use of an X-ray pinhole camera, the welding process has been continuously monitored. The results of this experimental work indicate that the point of beam impingement oscillates within the weld cavity at frequencies up to several hundred cycles per second with the exact value being determined by the total beam power, the beam power density, the speed of welding, and the properties of the material being welded. Results further indicate that increased penetration (spiking) occurs when this oscillation frequency is interrupted, i.e., the beam "drills" to the bottom of the weld cavity, reaches a steady state condition, and produces an additional welded depth or a spike.

Thus, there exists a need for a means and a method for eliminating spiking in partial penetration electron beam welds, and/or for main-taining the point of beam impingement in an oscillating condition at all times. The present invention was conceived to meet this need in a manner to be described hereinbelow.

SUMMARY OF THE INVENTION

It is an object of the present invention to provide a means and a method wherein spiking in partial penetration electron beam welds is eliminated.

It is another object of the present invention to provide a means for maintaining the point of beam impingement in a welding operation in an oscillating condition at all times during the welding process.

The above objects have been accomplished in the present invention by providing in an electron beam partial penetration welding process a means for interrupting the electron beam periodically thereby preventing the beam from attaining a steady state condition such as to maintain the beam's oscillatory mode of penetration during the welding process, thereby providing a finished weld that is spike free.

DESCRIPTION OF THE PREFERRED EMBODIMENTS

In an electron beam partial penetration welding process, fusion welds are formed between two members by focusing a beam of electrons on the juncture thereof in such a manner as to cause a molten zone to penetrate only partially through the two members.

Figure 1:
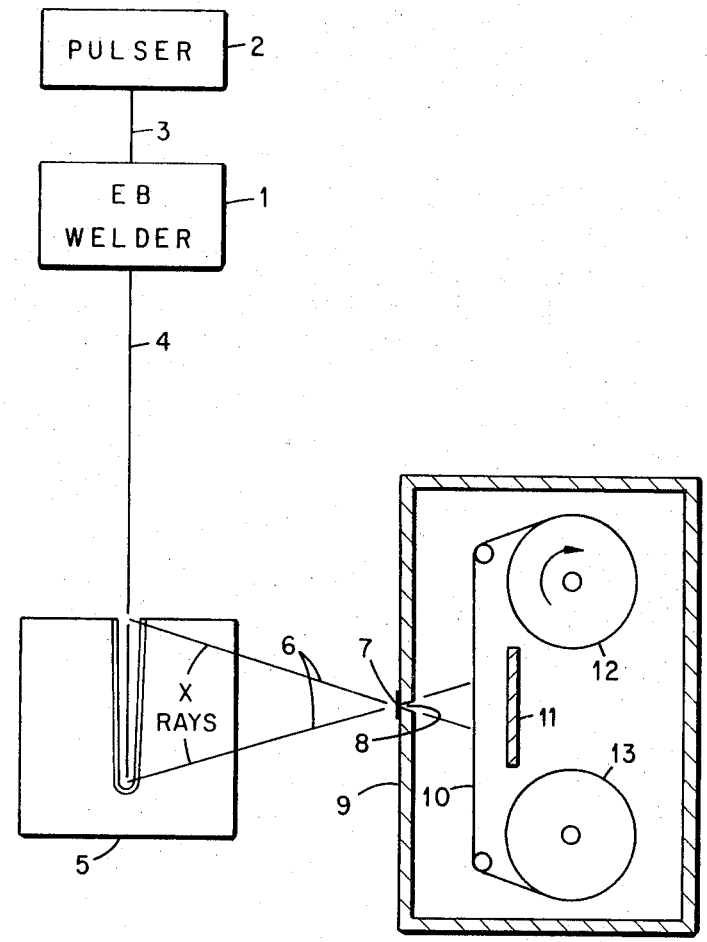
FIG. 1 is a schematic illustration of one embodiment of the present invention and includes an X-ray pinhole camera which is utilized for determining the natural frequency of oscillation of the point of beam impingement during a welding operation.

Referring to FIG. 1, a pinhole camera may be utilized for the determination of the quality of "partial penetration" electron beam welds without the necessity for destruction of the part being welded. Also, using the pinhole camera, it is possible to determine the natural frequency of oscillation of the point of beam impingement during a welding operation upon a given material and given operating conditions of the electron beam. Once this natural frequency of oscillation has been determined, the information is utilized in a unique manner as described hereinbelow.

The pinhole camera shown in FIG. 1 is housed in a 1/8 inch lead shielding box 9. The specimen 5 to be welded is positioned in such a manner that an electron beam 4 from a welder 1 is directed toward the joining section between the parts of specimen 5 to be welded. The primary emissions 6 (X-rays) resulting from the electron beam striking the specimen 5 to be welded are able to pass through an X-ray window 7 and a pinhole 8 in the box 9 and expose a moving X-ray sensi-tive film 10 in the camera. A lead shield 11 is mounted back of the film 10 where the remaining X-rays are attenuated. The film 10 is fed from a supply reel 13 onto a take-up reel 12. It should be noted that the camera that is mounted within the camera box 9 has been rotated in the drawing 90° from its actual position for the sake of illustration.

The pinhole 8 in the box 9 is about 0.003 inch in diameter. The film 10 of the camera may be a 25-foot roll of 35 mm Kodak "no-screen" X-ray movie film, for example. The pinhole-to-weld distance is 2.1 cm, and the pinhole-to-film distance is 4.2 cm, for example. The pinhole camera, the welder 1, and the specimen 5 to be welded are contained within an enclosure, not shown, and this enclosure is evacuated to a pressure of about $10^{-4}$ mm Hg, for example, before a welding operation is carried out. The electron beam welder 1 may be a Hamilton-Standard Model No. W1-0, for example.

During a welding operation, and concurrent operation of the pinhole camera, the moving X-ray film 10 is related to time by a flashing light which is directed through a hypodermic needle, not shown, to the film. The result is a small dot on the film which is spaced proportional to the rate of film movement.

In a typical welding operation, the welder 1 was set for operation at 150 Kv and 10 Ma, the welding speed was set for 22 ipm, and in rapid sequence, the timing circuit, film drive and the electron beam were energized. After a desired exposure time had elapsed, the beam was turned off and the film allowed to spool off. The film is then developed for interpretation of the data shown thereon.

The objective of partial penetration weld joints is to achieve a uniform depth. The use of the pinhole camera, as described above, provides a nondestructive method for determining the penetration depth of electron beam welds, which is accomplished by continuously monitoring the emission of primary X-radiation from an electron beam welding operation.

As mentioned hereinabove, the use of the pinhole camera and a study of the resulting developed film from a plurality of welding operations has revealed that for any given welding operation, the point of electron beam impingement oscillates within the weld cavity at frequencies up to several hundred cycles per second with the exact value being determined by the beam's total power, beam power density, speed of welding, and the properties of the material being welded. Also, results further indicate that increased penetration (spiking) occurs when this oscillation frequency is interrupted, i.e., the beam "drills" to the bottom of the weld cavity, reaches a steady state condition, and produces an additional welded depth or a spike.

Thus, if some means could be provided to maintain an electron beam of given parameters in its oscillating condition at all times during a welding operation, then welds could be effected that are spike free. Such a means has been provided in the present invention which will now be described.

The present invention may be described generally as follows: In an electron beam partial penetration welding process wherein fusion welds are formed between two members by focusing a beam of electrons on the juncture thereof in such a manner as to cause a molten zone to penetrate only partially through the two members, the improvement comprising interrupting the electron beam periodically for controlled critical intervals thereby preventing the beam from attaining a steady state condition.

This concept is based upon the discovery that spiking does not occur so long as the point of beam impingement is oscillating at its natural frequency within the weld cavity. This phenomenon was first noted in studies using the X-ray pinhole movie camera. It was noted that welds with uniform penetration are characterized by periods in which the beam continually oscillates within the weld cavity, while welds with erratic penetration are characterized by periods in which there is no oscillation of the point of beam impingement.

Based upon the discovery that erratic penetration results from periods of attainment of a steady state condition of the electron beam and that uniform penetration is characterized by an oscillating condition of the point of beam impingement, the present invention was conceived to provide a welding procedure in which the electron beam is periodically pulsed on-and-off in order to maintain its oscillatory mode of penetration. This is accomplished in the present invention by providing a pulser unit 2 coupled to the welder 1 by means of a lead line 3.

In a typical operation, for example, if a set of weld parameters and a given material resulted in a beam oscillation frequency of 150 cps, this would indicate a time requirement of 6.67 milliseconds for one "trip" of the beam 4 to the base of the weld cavity. At the end of this time, the beam 4 would be interrupted by the pulser 2 for a short period, for example, about 50.0 microseconds, allowing the "bored" cavity to begin collapsing. The beam 4 would then be turned on again by the pulser 2 and allowed to impinge upon the closed cavity beginning another downward trip. This predetermined pulsing schedule would then be maintained until the welding operation was finished. Thus, for the preceding operating parameters it can be seen that the beam on time is approximately 130 times longer than the beam off time.

Once the natural frequency of oscillation of the electron beam is established by the use of the pinhole camera for any given set of weld parameters and a given material, an appropriate pulsing schedule for the electron beam can be selected. The beam on time is simply the reciprocal of the oscillation frequency, and the beam off time is just a short interval long enough to guarantee the initiation of a closure event, yet short enough such that the weld is "thermally unaware" of any change.

Thus, the method of the present invention for spike control relies on the unique technique of utilizing the natural frequency of oscillation of the point of beam impingement within the weld cavity to set up a pulsing schedule which serves to maintain its frequency, thereby eliminating the spiking problem.

Instead of using the pinhole camera technique as described above for determining the natural frequency of oscillation of the point of beam impingement, and then utilizing this information to provide a pulsing schedule for the electron beam, this invention also includes automatic feedback control systems for appropriate pulsing of the electron beam to avoid spiking. The embodiments illustrated in FIGS. 2 and 3 provide such suitable feedback control circuits which will now be described.

Figure 2:
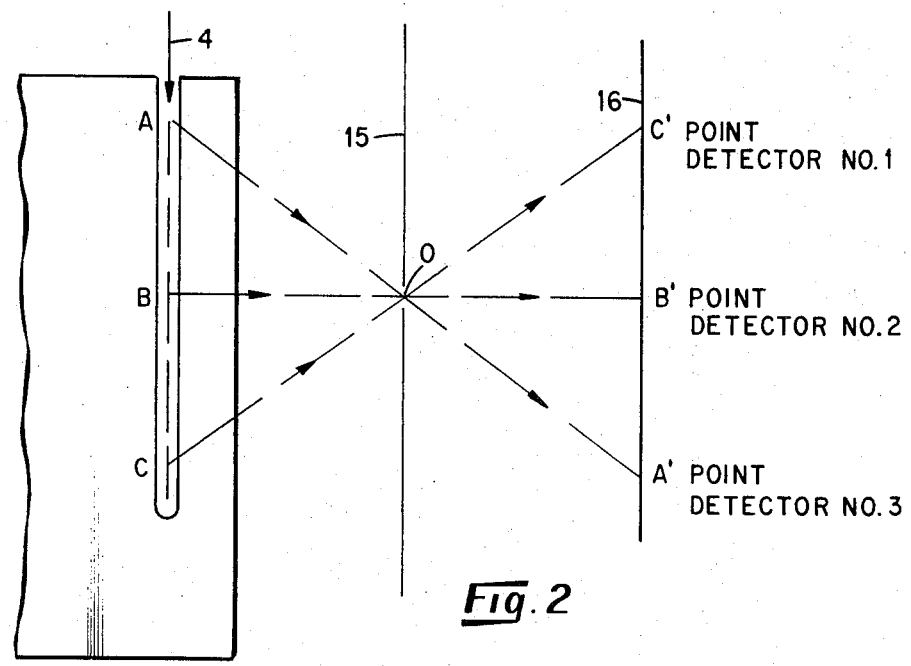
FIG. 2 is a schematic illustration of one system in which any change in the beam impingement oscillation frequency is used in a feedback circuit to pulse the beam.
Figure 3:
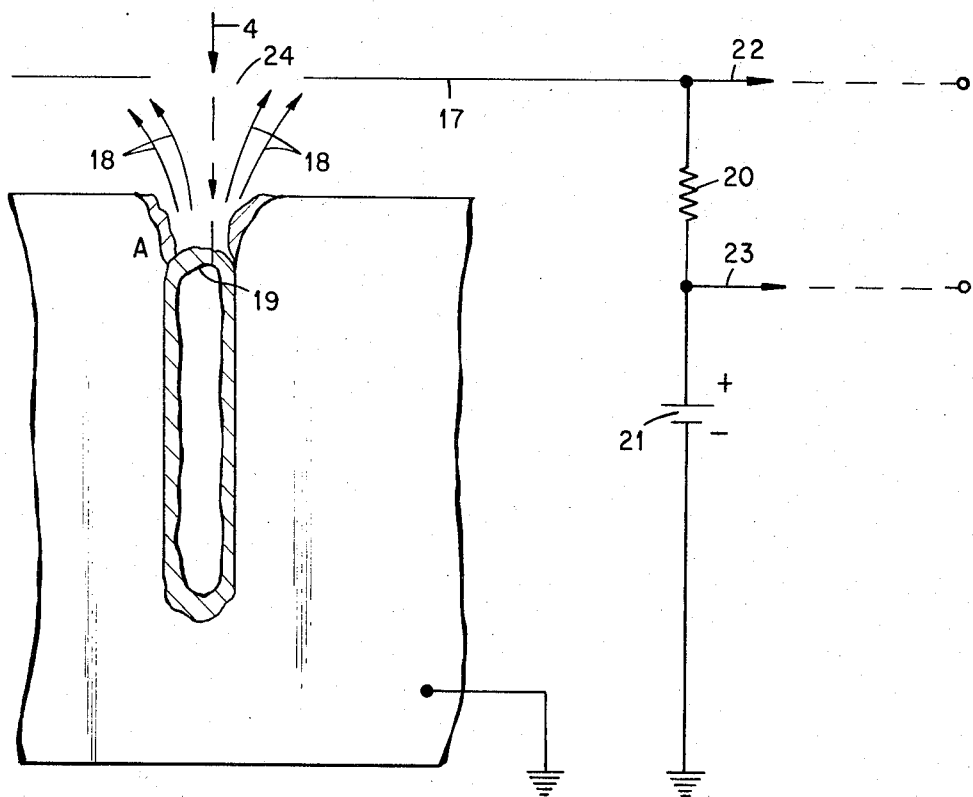
FIG. 3 is a schematic illustration of another embodiment of a feedback circuit for pulsing the electron beam in response to beam oscillation interruption.

As shown in FIG. 2, in normal (non-spiking) operation of the electron beam 4 within the weld cavity, the point of impingement of the electron beam oscillates rapidly from point A (high in the cavity) through intermediate points (exemplified by point B) to the lowest point in the normal weld cavity (point C). The pinhole image through the pinhole 0 of the lead sheet 15 of the point of beam impingement is inverted. When the electron beam strikes the molten metal near the top of the weld cavity at point A, its pinhole image appears at the lowest image point, shown as A' in the image plane 16. When the electron beam strikes at an intermediate point such as point B, its pinhole image is projected to an intermediate location shown as B'. When the electron beam strikes the molten weld metal near the bottom of the weld cavity, at point C, its pinhole X-ray image is cast upon point C' of the image plane 16. These locations correspond to those observed in the X-ray image recordings made with the pinhole camera of FIG. 1.

For purposes of automatic monitoring and feedback control of partial-penetration electron-beam welding processes, X-ray-sensing detectors are placed at points A', B', and C' (or at any single or two selected locations such as A', B', and C'). Such point detectors of X-ray could be any small-area, fast response transducer element which responds to the incident X-ray image beam by a change in electrical conductivity, an output electrical pulse, or other appropriate signal. Typical forms of X-ray detectors suitable for this purpose include (a) small ionization gauge devices, (b) small scintillation counters, (c) semiconductor devices such as radiation-responsive beads or crystals of cadmium-sulphide or selenium, (d) fluorescent screen elements illuminating photocells or photoconductor elements, or (e) X-ray sensing vidicon television camera tubes, as well as other devices providing equivalent functions.

During normal (non-spiking) operation of the electron-beam welding system, the pinhole image of the point of electron-beam impingement upon the molten weld metal oscillates rapidly between states represented by points A and C. The resultant pinhole image of the X-ray target point (where the electron beam strikes the molten weld metal) similarly oscillates rapidly and rather regularly between the corresponding image points A' and C', typically passing through image point B' as well. The electrical output signal pulses developed by the small-area detectors at image point locations A', B', and C' thus provide a relatively-regular series of individual pulses in each channel. These pulses are not usually coincident in time in all channels, but rather occur alternately in channel A', B' and C'. Thus, electronic counters can be employed in connection with each channel individually, to provide an average measure of the number of electron-beam oscillations per unit time (as per second, for example). Any interruption of this relatively-regular sequence of pulses from the two- or three- X-ray detectors (at A', B', and/or C') is an immediate indication of an interruption to the regular oscillation of the weld metal which intercepts the electron beam during welding. Such an interruption is the prelude and cause of spiking. Thus, signal interruption is the vital predictor that spiking events will follow, when the electron beam impinges at the bottom of the weld cavity for a prolonged interval of time (say, for the duration of two or more cycles of the normal oscillation frequency). This signal interruption can be detected by simple electronic circuitry, which in turn provides the signal to interrupt the electron beam used in the welding process. This interruption need persist only for the normal time duration of perhaps one cycle or a few cycles of the normal weld oscillation phenomenon to prevent spiking. After such a suitable interval, the electron beam is again turned on by the control system, to restore normal welding operation, characterized by the relatively-regular oscillation of the point of electronbeam impingement which varies from locations A through B to C, etc.

However, more sophisticated logic systems can be used to monitor the signals provided by the X-ray image beam sensors at points A', B', and C'. For example, in normal oscillations, it could be expected that sensors at points A', B', and C' would be excited sequentially in regular order. Electronic (And/Or or Nand) logic circuits could be used to recognize any irregularities in pulse frequencies or sequence of pulses in the multiple channel detector system. Characteristic signature signals might then be established which characterize the onset of spiking conditions.

In addition, the output signals from the X-ray detectors at points A', B', and C' could be used to sound alarms, provide chart recordings, or mark welds at points where spiking occurred.

An alternative method for detecting electron-beam weld cavity oscillations characteristic of normal partial-penetration operation, and of interruptions to this normal oscillation which typically precede spiking conditions, employs an electrode system to detect plasma emitted or ejected from the top opening of the electron beam weld cavity. In this system, illustrated in FIG. 3, a collector electrode 17 is placed above and in proximity to the top surface of the material being welded. A hole 24 drilled through this collector electrode permits the welding electron beam 4 to pass through the hole and impinge upon the work material being welded, without interference to the welding operation. (In this illustration, it is assumed that the electron beam is fixed in position, and that the work material travels in the direction of the weld seam beneath the stationary electron beam. This is usual in many industrial electron-beam welding systems. In other systems in which the source of the electron beam moves over a fixed workpiece, this collector electrode and hole for the electron beam passage can be moved synchronously with the electron beam gun, for example, by attaching it to the electron gun assembly.)

During normal electron-beam welding conditions, and particularly when the electron beam 4 impinges upon molten weld metal 19 near the top of the weld cavity (as at point A in FIG. 2), metal vapor jets 18 are ejected from the top of the weld cavity. Because of the very high temperature associated with this ejected metal vapor, it exists in a highly-ionized, or "plasma" state. Tests have shown that the collector electrode 17 can be used to collect an electric current or charge, proportional to the density of plasma ejected from the hole. Selection can be made of whether the collected charge is electrically positive or negative, by applying a suitable (opposite polarity) potential to the collector by means of a bias battery 21 connected to collector 17 through a load resistor 20. The collector thus operates in a manner analogous to typical ionization gages. When a burst of ionized vapor plasma is ejected from the opening in the weld cavity (which serves as the entrance portal for the welding electron beam), which occurs most typically when the electron beam strikes the molten weld metal near the top of the weld cavity at point A, an electrical signal is provided by the collector electrode 17. Typically, this signal can be easily detected by the voltage drop across the series resistor 20 in the circuit connecting the collector through the battery 21 (or bias voltage source) to ground. The battery 21 can be connected as either polarity such as to oppose the polarity of the collector electrode 17 potential.

In tests, it has been shown that this collector electrode potential or output signal current from the leads 22 and 23 connected across the load resistor 20 oscillates in direct synchronization with the molten metal oscillations within the weld cavity. During normal electron-beam welding conditions (without spiking), the collector electrode signal pulse frequency is similar to the frequency of oscillation observed with the X-ray camera system (illustrated in FIG. 1). Thus, when the collector electrode signals continue to pulse with relative regularity, normal welding without spiking events is occurring. However, if this relatively-regular signal frequency is interrupted for a period corresponding to one or a few typical normal oscillation cycles, it is evident that a spiking event is occurring or about to occur.

Again, simple logic circuits connected to the output leads 22 and 23 can be used to distinguish such interruptions of normal oscillation frequency. These logic circuits, in turn, can be used to interrupt the welding electron beam essentially instantly, to prevent the spiking event from occurring. Alternatively, they could serve also to actuate alarm or indicator systems, prepare graphic records showing weld locations at which spiking events occurred, or otherwise provide continuous monitoring of the partial-penetration electron-beam welding operation.

The X-ray and plasma monitor and control systems described above can be used to interrupt (or turn off and then on) the welding electron beam upon command, by methods well-known in connection with medical X-ray exposure control, or widely-used in control of high-voltage electron beams, as in cathode-ray oscilloscopes and other devices. In many cases, such systems are provided with electron guns which include control grid assemblies between the electron-emitting cathode and the accelerating anode. When such a control grid is biased sufficiently negatively, its field prevents electrons emitted from the cathode from passing through or by the control grid to the accelerating anode. This effectively turns off the electron beam from the gun system. Similar grids are also commonly used not only in this direct On-Off switching mode, but also in Z-axis (or beam current amplitude control) systems for modulating electron-beam intensity. Many electron beam welders incorporate such control grids in their electron gun structures. In such cases, control signals from the partial-penetration electron-beam welding system monitoring and detection systems described above can be used directly to provide control signals to this control grid on the electron-beam welder.

Alternatively many X-ray power supplies and power supplies for electron-beam welders employ valve tubes (high-voltage triodes) to rectify and control electron-beam current magnitudes. The control grids within these valve tubes can be used directly to interrupt (turn off and then on again) the beam in the electron-beam welder. Where applicable, semiconductor or solid-state devices such as silicon-controlled rectifiers can be similarly controlled.

This invention has been described by way of illustration rather than limitation and it should be apparent that it is equally applicable in fields other than those described.

What is claimed is:

1. A method for preventing spiking in a partial penetration electron beam welding process, comprising the steps of energizing an electron beam, directing said beam onto a workpiece to be welded, pulsing said beam intermittently so as to form beam pulses in accordance with a pulsing schedule, measuring the natural frequency of oscillation of the point of beam impingement into the weld cavity formed by said beam, and adjusting said pulsing schedule to provide an electron beam on time which is the reciprocal of said beam oscillation natural frequency and a beam off time which is a substantially shorter interval than said beam on time, said beam off time being long enough to guarantee the initiation of a weld closure event yet short enough such that the weld is thermally unaware of any change, whereby said adjusted pulsing schedule maintains said beam in an oscillating condition at all times during the welding operation to thereby produce a spike-free weld.

2. The method set forth in claim 1, wherein said beam oscillation natural frequency is 150 cps, thus said beam on time is 6.67 milliseconds, and said beam off time is 50.0 microseconds.

3. The method set forth in claim 1, wherein said measuring step is effected by intercepting the X-ray beams from said weld cavity after passing through a pinhole with a plurality of point detectors, and including the further step of controlling said pulsing schedule in accordance with any interruptions of said natural frequency of oscillation as determined by said point detectors, thereby maintaining said frequency of oscillation during said welding operation to produce said spike-free weld.

4. The method set forth in claim 1, wherein said measuring step is effected by intercepting metal vapor plasma jets from a molten metal weld closure in said weld cavity with a collector electrode to provide an output signal as a function of said frequency of oscillation of said point of beam impingement within said weld cavity, and including the further step of controlling said pulsing schedule in accordance with any interruptions of said natural frequency of oscillation as determined by said collector output signal, thereby maintaining said frequency of oscillation during said welding operation to produce said spike-free weld.

* * * * *